(12) United States Patent
Agrawal

(10) Patent No.: US 7,912,853 B2  
(45) Date of Patent: Mar. 22, 2011

(54) QUERY PROCESSING CLIENT-SERVER DATABASE SYSTEM

(75) Inventor: Sheshnarayan Agrawal, Deoker (IN)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 11/745,275

(22) Filed: May 7, 2007

(65) Prior Publication Data

US 2008/0281782 A1 Nov. 13, 2008

(51) Int. Cl.
*G06F 17/30* (2006.01)
(52) U.S. Cl. ........................................................ 707/771
(58) Field of Classification Search .................. None
See application file for complete search history.

(56) References Cited

U.S. PATENT DOCUMENTS

2004/0073549 A1* 4/2004 Turkel et al. ...................... 707/5

OTHER PUBLICATIONS

Lelli, F., et al, "Improving the performance of XML based technologies by caching and reusing information," Sep. 18-22, 2006, International Conference on Web Services 2006, IEEE, pp. 689-700.*

Iguchi, K., et al., "Schema based enhancement of XPath engine," Jul. 11-15, 2005, International Confeence on Web Services 2005, IEEE, pp. 1-8.*

Christoph Schittko, "TopXML, Great XML Tools", http://www.topxml.com.

Jonathan Knudsen, "Parsing XML in J2ME", http://developers.sun.com, Mar. 7, 2002, pp. 1-11.

Akhil Gupta, et al., "Skipping Streams with XHints", Department of Computer Science, University of Maryland, College Park, MD, pp. 1-24.

Dart Communications, "PowerTCP Secure FTP for .NET", QBS Software, Ltd., Apr. 16, 2007, 2 Pages.

Suita Gupta, et al., "Leverage Your Oracle 10g Skills to Learn DB2 9.1 for Linux, UNIX and Windows", International Business Machines, Jul. 17, 2003, Updated Nov. 2, 2006, 26 Pages.

* cited by examiner

*Primary Examiner* — Neveen Abel Jalil  
*Assistant Examiner* — Farhan M Syed  
(74) *Attorney, Agent, or Firm* — Sawyer Law Group, P.C.

(57) ABSTRACT

There is disclosed a method for processing a query in a client-server database system comprising a server for managing content in a database and at least one client connected to the server via a network. The method comprises inputting a query from an application; and transmitting the inputted query to the server, skipping a query parsing processing at the client. The server parses the query transmitted from the client computer module and executes the query by manipulating the data in the database according to the query.

8 Claims, 5 Drawing Sheets

```
typedef struct tagSTMT_OPT{
    UDWORD      *bookmarkPtr;
    UDWORD      async_enable;
    UDWORD      auto_ipd;
    .....
    ....
    UDWORD      skipParsing;
} STMT_OPT, FAR * LPSTMT_OPT;
```

Fig. 4(a)

```
Case SQL_IFMX_ODBC_SKIP_PARSING:
{
    stmtp->option.skipParsing = <value(TRUE or FALSE) of
parameter passed to SQLSetStmtAttr>;
}
break;
```

Fig. 4(b)

```
for( index = 0; SQLStatementTokens[index].stmtType; index++ )
{
   match = 0;
   for( tokindex = 0; SQLStatementTokens[index].tok[tokindex]; tokindex++ )
   {
      if( SQLStatementTokens[index].tok[tokindex] == kw[tokindex]->tok )
      {
         match = 1;
      }
      else
      {
         match = 0;
         break;
      }
   }
   if( match )
   {
      *stmtType = SQLStatementTokens[index].stmtType;
      goto Exit;
   }
}
```

Fig. 4(c)

QUERY PROCESSING CLIENT-SERVER DATABASE SYSTEM

FIELD OF THE INVENTION

The present invention relates to a method, a system, and a computer program product for processing queries in client-server database systems.

BACKGROUND

In conventional database systems having client-server architecture, a SQL (Structured Query Language) query (hereinafter also referred to as a query) requested by an application run by a client is transmitted to the server, which executes the query and returns a response consisting of a result to the query for the client. Typically, such applications would request operations such as "insert", "delete", "update", and "retrieve" to be executed in the form of SQL query. This SQL query is then intercepted by the client and parsed as a client code by processing the query as follows:

C1. Breaking the SQL query into individual, tokens, and
C2. Checking the SQL query for correctness of syntax and semantics.

Such processing ensures the conformance of the SQL query to the SQL constructs for the server, or DBMS (Database Management System), to which the SQL query is directed.

If the SQL query contains an ODBC (Open Database Connectivity) escape sequence, then it is converted to a native SQL query in a syntax that is supported by the destination server. With this step, an ODBC escape sequence in a construct specified by the client is converted to a native SQL construct that can be interpreted by the specific server.

After parsing the SQL query, the client transmits the SQL query to the server. To process the SQL query, the server typically performs the following five steps;

S1. Parsing the SOL query by breaking the SQL query into individual tokens and checking the SQL query for correctness of syntax and semantics. This is similar to the steps C1 and C2 performed by the client.
S2. Validating the SQL query. This is to check the SQL query against the system catalogue.
S3. Optimizing the SQL query. This is done to explore various ways to carry out the access plan for the query execution.
S4. Generating an access plan for the SQL query using information from the system catalogue.
S5. Executing the SQL, query by running the access plan.

After processing the SQL query, the server returns the result of the execution of the SQL query (S5) to the application that is executing on the client.

A disadvantage with such a client-server environment is that performance of executing the SQL query is dependent on the relatively large response time involved In processing transactions. A further associated disadvantage is the inefficient use of resources in such client-server corroboration. This disadvantages occur partially due to the processing in the conventional database systems with a client-server architecture, where the query parsing is performed at the client and the server.

Therefore, there exists a need for efficiently processing SQL queries in a database system, especially in a client-server architecture.

SUMMARY

There is disclosed a method for processing a query in a client-server database system comprising a server for managing content in a database and at least one client connected to the server via a network. A query is provided as input to the client from an application; and the inputted query is transmitted to the server wherein a query parsing processing is skipped at the client. The server parses the query transmitted from the client and executes the query by manipulating the data in the database according to the query.

An advantage with the present system is that when query parsing is performed at the server end, overheads from repeated parsing at the client end are avoided, thereby improving the overall response time and reducing the use of resources of the client.

There is also disclosed a client-server database system having a server for managing data in a database and at least one client connected to the server via a network and a method of query processing in the client-server database system. A query is provided as input to the client from an application. The client transmits the input query to the server, wherein processing of a query parsing is skipped at the client. The server parses the query received from the client, and executes the query by manipulating the data in the database according to the query.

There is also disclosed a computer program product having a computer readable medium having a computer program recorded therein for query processing in a client of a client-server database system having a server for managing data in a database and at least one client connected to the server via a network. The computer program comprises computer program code for inputting a query from an application; and computer program code for transmitting the inputted query to the server, wherein a query parsing processing is skipped at the client. The server parses the query transmitted from the client and executes the query by manipulating the data in the database according to the query.

Other aspects of the invention also are disclosed.

BRIEF DESCRIPTION OF THE DRAWINGS

Embodiments of this invention will now be described with reference to the drawings, in which:

FIGS. 4a-4c shows an exemplary embodiment of examples of sections of the code for the driver of the client according to the present invention.

DETAILED DESCRIPTION

Client-Server Database System and Computer Platform for the Client

Figure 1:
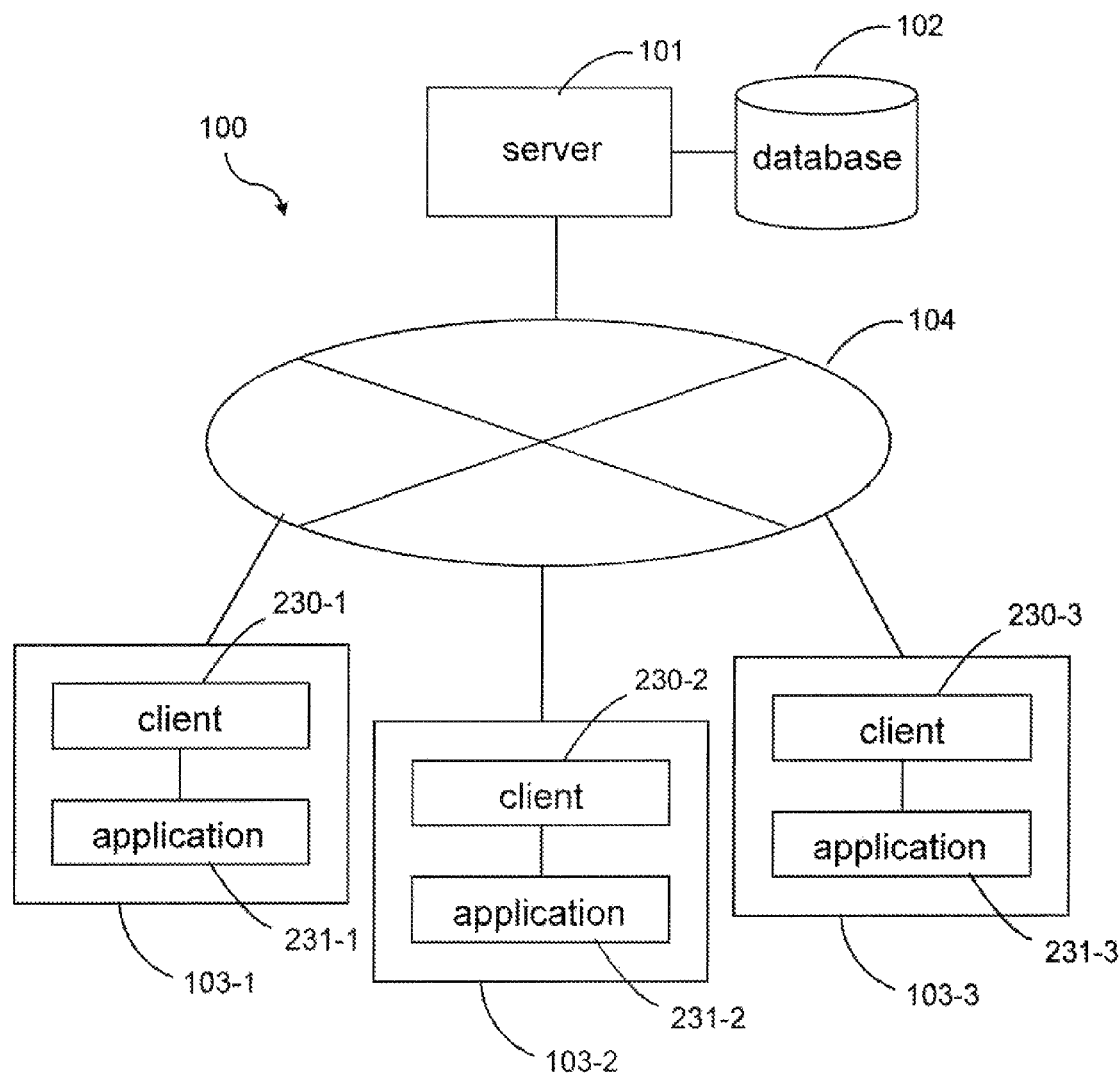
FIG. 1 shows an exemplary embodiment of a diagram of a client-server database system on which ibis invention can be implemented.

FIG. 1 shows an exemplary embodiment of a diagram of a client-server database system 100 with which arrangements described below using FIGS. 2 to 5 can be implemented. The client-server database system 100 has a database 102, a server 101 and computer modules 103. Clients 230 are housed in the computer modules 103 which can access the server 101 over a network 104. The server 101 manages and handles processing of the content (hereinafter also referred to as data and/or information records) stored in the database 102. A database 102 is an organized collection of information records stored in a storage device in a systematic manner, and can be accessed by the clients 230 by means of queries, where the server 101 is configured to execute the queries on the database 102 and return a response containing the desired results to the clients. The clients 230 are also in communication with applications 231 such as software programs run by computer modules 103 to output queries. In one embodiment, the server 101 and the database 102 may be housed in the same computer module. In an alternate embodiment, the server 101 and the database 102 may be housed in separate computer modules which may be coupled to each other. Similarly, in one embodiment, the clients 230 and the applications 231 which request the server 101 for specific content in the form of queries can be housed within the same computer module or alternatively in separate computer modules.

A client typically includes an interface module between an application residing on the client side and the server 101, for example. Open Database Connectivity (ODBC), OLEDB (Object Linking and Embedding Database), .NET, or ESQL/C (Embedded SQL C (C language)). The following embodiment will be described using ODBC as an example. It should be apparent to a person skilled in the art that the use of other interfaces modules replacing the ODBC fall within the scope of this invention. ODBC is an interface standard that makes it possible to access data from a variety of Database Management Systems (DBMS), or servers 101. The DBMS vendors provide data access functionality for their respective DBMSs through the ODBC programming interface, which in turn makes it possible for an application on a client to access multiple DBMSs through this interface. In the classic concept of client-server architecture, ODBC will be part of the client while the DBMS is a part of the functionality of the server 101 that is relevant to the present invention. DBMS of the server 101 controls the organization, storage and retrieval of data in the database 102.

Figure 2:
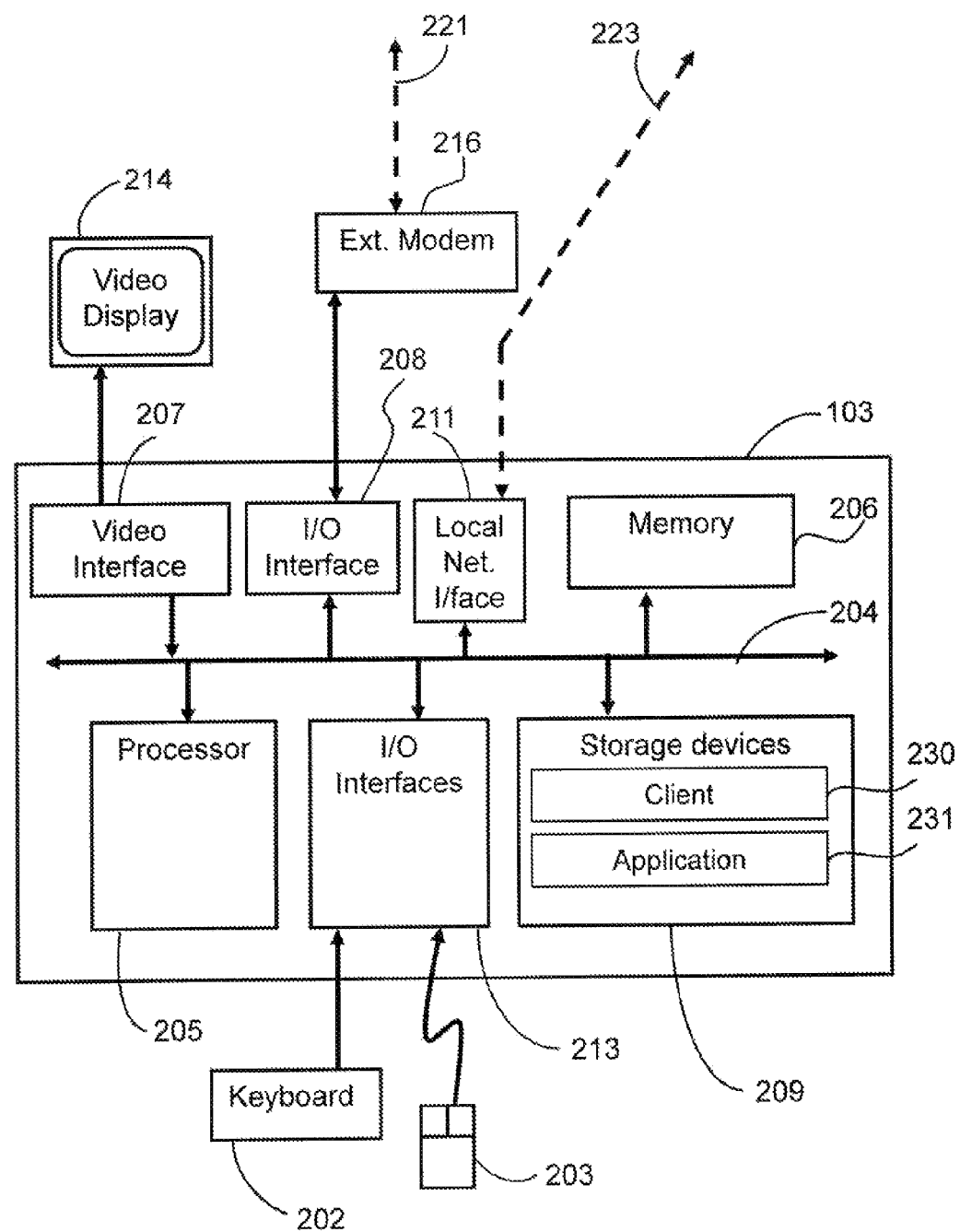
FIG. 2 shows an exemplary embodiment of a block diagram of a computer system of the client side on which this invention can be implemented.

FIG. 2 shows an exemplary embodiment of a block diagram of a general purpose computer module 103 housing the client with which arrangements described below using FIGS. 3 to 5 can be implemented. The processes and code modules shown in FIGS. 3 to 5 may be implemented as software, such as one or more application programs executable within the client-server database system 100. The instructions may be formed as one or more code modules, each code module for performing one or more particular tasks. The computer modules 103 including a client 230 has at least a first part of software and a corresponding code module for processing queries received from an application 231 to be executed by the server. The computer module 103 may also have a second part of software and a corresponding code module for executing the application 231 which outputs queries. The computer module 103 may also have a third part of software and a corresponding code modules for managing a user interface or the inter-device interface used for such tasks as receiving user commands, displaying processing outcome or communicating with the server 101 via a network 104. The software may be stored in a computer readable medium, including the storage devices described below, for example. The software is loaded onto the server 101 and the computer modules 103-1 to 3 from the computer readable medium, and then executed by a respective apparatus. A computer readable medium having such software or computer program recorded on it is a computer program product. The server 101 accessible by the computer module 103 has similar configuration of software and a corresponding code module to realize functions for executing queries.

As illustrated in FIG. 2, the computer module 103 has input devices such as a keyboard 202 and a mouse pointer device 203, and output device may be a display device 214. An external Modulator-Demodulator (Modem) transceiver device 216 may be used by the computer module 103 for communicating to and from a communications network 104 via a connection 221. The network 104 may be a wide-area network (WAN), such as the Internet or a private WAN. The network 104 couples the computer module 103 to the server 101 and the database 102.

The computer module 103 typically includes at least one processor unit 205, and a memory unit 206 for example formed from semiconductor random access memory (RAM) and read only memory (ROM). The computer module 103 also includes a number of input/output (I/O) interfaces including a video interface 207 that couples to the video display 214, an I/O interface 213 for such devices like the keyboard 202 and mouse 203, and an interface 208 for the external modem 216. In some implementations, the modem 216 may be incorporated within the computer module 103, for example within the interface 208. The computer module 103 may also have a local network interface 211 which, via a connection 223, permits coupling of the computer module 103 to a local computer network, known as a Local Area Network (LAN), for the network 104 connecting the computer module 103 to the server 101 and the database 102. The interface 211 may be formed by an Ethernet™ circuit card, a wireless Bluetooth™ or an IEEE 802.11 wireless arrangement.

In one embodiment, storage devices 209 are provided and typically include a hard disk drive (HDD). It should be apparent to a person skilled in the art that other storage devices such as a floppy disk drive, an optical disk drive and a magnetic tape drive etc, (not illustrated) may also be used and fall within the scope of this invention. The components 205 to 213 of the computer module 103 typically communicate via an interconnected bus 204 and in a manner which results in a conventional mode of operation of the computer module 103 known to those in the relevant art.

Typically, the application programs discussed above ark resident on the storage device 209 and read and controlled in execution by the processor 205. Storage of intermediate product from the execution of such programs may be accomplished using the semiconductor memory 206, possibly in concert with the hard disk drive 210. In some instances, the application programs may be supplied to the user encoded on one or more CD-ROM or other forms of computer readable media and read via a respective drive, or alternatively may be read by the user from the network 104.

The third part of the application programs and the corresponding code modules mentioned above may be executed to implement one or more graphical user interfaces (GUIs) to be rendered or otherwise represented upon the display 214 or to implement other modes of input/output or storage control. Through manipulation of the keyboard 202 and the mouse 203, a user of the computer module 103 and the application may manipulate the interface to provide controlling commands and/or input to the applications associated with the GUI(s).

Query Processing

Figure 3:
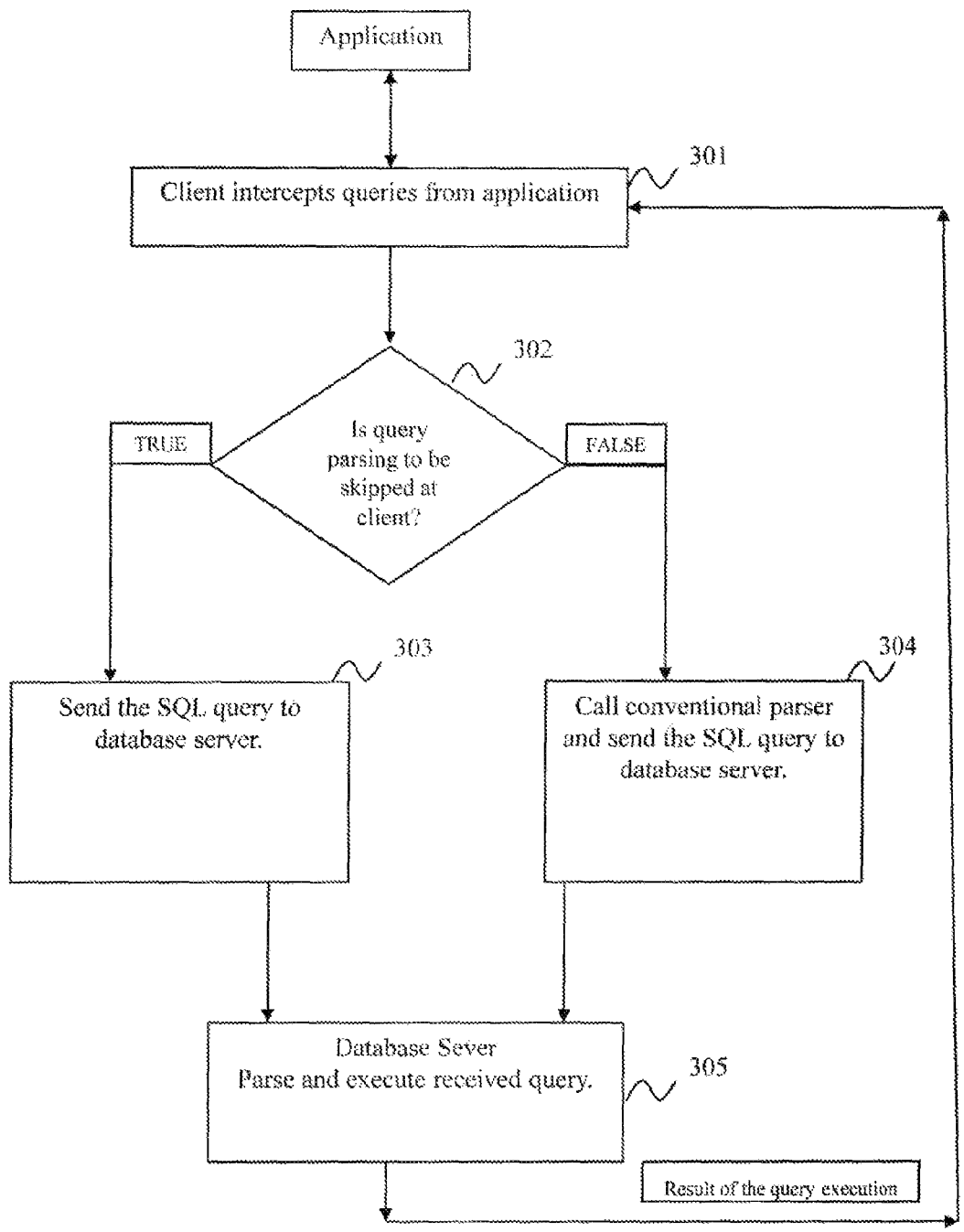
FIG. 3 is an exemplary embodiment of a flowchart of query processing according to the present disclosure.

FIG. 3 illustrates an exemplary embodiment for processing of queries. When an application 231 outputs an enquiry in the form of a query, in step 301, the client 230 intercepts the query before passing if onto the server 101 of the client-server database system 100. In step 302, the client 230 determines whether of not parsing of the intercepted query can be skipped at the client. Whether or not the parsing the intercepted query is to be skipped is specified by the application (e.g. application 231) that outputs the query. The application may specify skipping (or non-skipping) of parsing each of the intercepted queries at the client-end, or may switch between specifying skipping and non-skipping with arbitrary timing. If the parsing of the intercepted query is to be skipped, then the client transmits/sends the intercepted query to the server without performing any conventional parsing on the query (step 303). If the parsing of the intercepted query is not to be skipped, the client performs query parsing and then transmits/sends the query to the server (step 304). When the server receives the enquiry (i.e. input query) from the client 230, the server 101 parses and executes the query by manipulating data in the database 102 and returns the response/result to the application 231 via the client 230. By performing step 303 instead of performing conventional query parsing, the same process of performing query parsing which would be repeated at the server 101 is avoided at the client. An advantage is that the performance of the client-server database system can be improved with shorter response time, reduced overhead for code execution and runtime memory requirements, especially at the client-end, for query processing.

When query parsing is skipped, the client 230 may still perform minimal processing on the query, such as determining the query type or the number of parameters of the query. Such information can be used for further execution of the appropriate portion of the client (ODBC) code based on type of SQL queries (i.e. Data Definition Language, Data Manipulation Language etc) and also used to send the number of parameters (if any) to server (database). An advantage of performing minimal processing on the query is that a large part of the query parsing can be avoided at the client-end without forfeiting the function for the client to obtain essential information from the query.

In an alternative embodiment, steps 302 and 304 may be excluded from the processing at the client, so that all queries from the application through the client 230 are passed onto the server 101 without being parsed. This configuration can be employed to simplify the structure of the client and the application. For example, it would be advantageous not to implement steps 302 and 304 if it is known at the time of building the client-application system that the application will only output queries that do not need parsing.

An implementation of processes shown in FIG. 3 will be described in more detail. Software (hereinafter also referred to as program and/or code) written using Open Database Connectivity (ODBC) programming language interface for the client 230, and ODBC Application Program Interface (API) calls for the application is used as an example.

To introduce the option of skipping the process of query parsing, an element called "skipParsing" is added to the structure "tagSTMT_OPT" in the ODBC driver as shown in FIG. 4(*a*). "tagSTMT_OPT" is a structure that is used to define various options/attributes, to be used across various stages in the client (ODBC) code. By default, the value of element "skipParsing" is set as FALSE (i.e. the parser code is NOT to be skipped), and to enable skipping the parser, the parser code is set as TRUE.

In the code for the client 230, ODBC SQLSetStmtAttr, the logic shown in FIG. 4(*b*) is applied to allow the client 230 to detect a control code for skipping the query parsing specified by the application 231.

In a further part of ODBC source code for the client 230 for controlling parser routines, the following logic may be added. If query parsing is to be skipped, (If (stmtp→option.skipParsing==TRUE)), minimal processing such as determination of the number of parameters in the query and the determination of query type can be performed.

To determine the number of parameters in the query, a code to look for parameter symbol "?" and to store the count of this symbol occurring in a given SQL query can be used.

To determine the query type, the element "stmtp->stmt-type" which is known in the existing ODBC source code can be used. For faster matching of SQL query, a hash table for array of keywords listing query types can be used. The query inputted from the application 231 is scanned, and matched keywords are stored in the local variable. Once the identifying and storing of the keyword is completed, the stored keyword value is checked against the array of queries and the query type is set accordingly. FIG. 4(*c*) show an example of code to implement this function.

By skipping the parser code, which may be large, and having relatively small sections of code, the overhead for obtaining necessary information from the query is reduced, thereby achieving significantly better performance. Especially, a large amount of buffer space taken up to store tokens of the query and the processing load for syntax check in query parsing is avoided by employing this minimal processing approach. Query parsing processes such as syntax check can be skipped at the client 230 as an equivalent process is performed later at the server-end before the execution of the queries.

If the application specifies that query parsing by the client 230 is not to be skipped (If (stmtp→option.skipParsing==FALSE), then the client 230 performs query parsing in accordance with the conventional approach.

The decision to skip or not skip query parsing at the client-end can be made in accordance with the needs of the database system or the client/application configurations. Implementation of this decision in the application source code will be described later.

An example of a case where the client-end query parsing cannot be skipped is when the query contains ODBC Escape Sequence which handles values such as date and timestamp in a manner specific to the client. If the ODBC Escape Sequence is part of the query, then parsing to convert the escape sequence to native format which can be understood by the server 101 becomes essential.

The following is an example of an ODBC escape sequence which necessitates the client-end query parsing:

Select {fn ABS(DECIMALCOL)} from GTABLE where INTEGERCOL=1;

Alternatively, the same query can be written without ODBC Escape Sequences, that enable skipping of client-end query parsing:

Select ABS(DECIMALCOL) from GTABLE where INTEGERCOL=1;

To switch ON/OFF skipping of the client-end query parsing, a control command for switching the attribute SQL_IFMX_ODBC_SKIP_PARSING can be used in the source code of the application. The following control command used in the application source code enables the skipping of the client-end query parsing for queries that follow. The step 303 is then performed.

SQLSetStmtAttr (hstmt, SQL_IFMX_ODBC_SKIP_PARSING, SQL_TRUE, 0)

The following control command used in the application source code disables the skipping of the client-end query parsing for queries that follow. The step 304 is then performed.

SQLSetStmtAttr (hstmt, SQL_IFMX_ODBC_SKIP_PARSING, SQL_FALSE, 0);

In the example of the application source code shown in the appendix, the client-end query parsing is enabled by the command of line 0030 indicated in the appendix, and is later disabled by the command of line 0136 indicated in the appendix. As a result, client-end parsing is skipped for queries that are output between line 0031 and line 0135 indicated in the appendix, and queries output after line 0137 indicated in the appendix is parsed by the client 230. The calls of the function SQLExecDirect( ) executes the SQL queries and a respective result (success/failure) will be returned in a variable identified as rc. It is noted that, although specific embodiments have been illustrated and described herein, it will be appreciated by those of ordinary skill in the art that any arrangement calculated to achieve the same purpose my be substituted for the specific embodiments shown. This application is thus intended to cover any adaptations or variations of embodiments of the present invention. Therefore, it is manifestly intended that this invention be limited only by the claims and equivalents thereof.

APPENDIX

Application Example:

```
<All necessary header file inclusion>
int main( )
{
  RETCODE        rc = SQL_SUCCESS;
  HENV           henv = NULL;
  HDBC           hdbc = NULL;
  HSTMT          hstmt = NULL;
  printf ("Allocate environment and connection handles...\n");
  rc = SQLAllocHandle( SQL_HANDLE_ENV,
  SQL_NULL_HANDLE, henv );
  CHKERROR(henv, NULL, NULL, rc, SQL_SUCCESSS);
  rc = SQLSetEnvAttr(henv, SQL_ATTR_ODBC_VERSION,
  (void*)SQL_OV_ODBC3,0);
  CHKERROR(henv, NULL, NULL, rc, SQL_SUCCESS);
  rc = SQLAllocHandle( SQL_HANDLE_DBC, henv, &hdbc );
  CHKERROR(henv, hdbc, NULL, rc, SQL_SUCCESS);
/* connect to the server/database */
  rc = SQLDriverConnect(hdbc, NULL, "DSN=dsnname", SQL_NTS,
NULL, 0, NULL, SQL_DRIVER_NOPROMPT);
  CHKERROR(henv, hdbc, NULL, rc, SQL_SUCCESS);
  /* Allocate statement handle */
  rc = SQLAllocHandle( SQL_HANDLE_STMT, hdbc, &hstmt );
  CHKERROR (henv, hdbc, hstmt, rc, SQL_SUCCESS);
/* Enable (by setting to SQL_TRUE) the skip parser attribute */
rc = SQLSetStmtAttr( hstmt, SQL_IFMX_ODBC_SKIP_PARSING,
SQL_TRUE, 0);
  CHKERROR (henv, hdbc, hstmt, rc, SQL_SUCCESS);
  rc = SQLExecDirect(hstmt, (SQLCHAR *)
  "DROP TABLE cim_target", SQL_NTS);
  CHKERROR (henv, hdbc, hstmt, rc, SQL_SUCCESS);
  rc = SQLExecDirect(hstmt, (SQLCHAR *) "DROP TABLE
cim_target_driver", SQL_NTS);
CHKERROR (henv, hdbc, hstmt, rc, SQL_SUCCESS);
  /* Lets create the dropped tables */
  rc = SQLExecDirect (hstmt, "CREATE TABLE cim_target ("
       "luid          INTEGER DEFAULT 0 NOT NULL, "
       "source        INTEGER DEFAULT 0 NOT NULL, "
       "sequence      INTEGER DEFAULT 0 NOT NULL, "
       "quality       INTEGER DEFAULT 0 NOT NULL, "
       "etype         INTEGER DEFAULT 0 NOT NULL, "
       "label_min     INTEGER DEFAULT 0 NOT NULL, "
       "label_max     INTEGER DEFAULT 0 NOT NULL, "
       "hidden        SMALLINT DEFAULT 0 NOT NULL, "
       "deleted       SMALLINT DEFAULT 0 NOT NULL, "
       "missing       SMALLINT DEFAULT 0 NOT NULL, "
       "device        INTEGER DEFAULT 0, "
       "device_etype  INT8 DEFAULT 0, "
       "owner         INTEGER DEFAULT 0, "
       "proxy_state   INTEGER DEFAULT 0, "
       "proxy_version INTEGER DEFAULT 0, "
       "proxy_touch   INTEGER DEFAULT 0, "
       "public_target SMALLINT DEFAULT 0, "
       "device_type   INTEGER DEFAULT 0, "
       "reschedule    INTEGER DEFAULT 0, "
       "PRIMARY KEY (luid, source, sequence))", SQL_NTS);
```

APPENDIX-continued

Application Example:

```
CHKERROR (henv, hdbc, hstmt, rc, SQL_SUCCESS);
rc = SQLExecDirect (hstmt, "CREATE INDEX
cim_target_0_sequence_ix
ON cim_target (sequence, source)", SQL_NTS);
CHKERROR (henv, hdbc, hstmt, rc, SQL_SUCCESS);
rc = SQLExecDirect (hstmt, "CREATE INDEX
cim_target_1_source_ix ON
cim_target (source, sequence)", SQL_NTS);
CHKERROR (henv, hdbc, hstmt, rc, SQL_SUCCESS);
rc = SQLExecDirect (hstmt, "CREATE INDEX
cim_target_2_source_ix ON
cim_target (label_min, label_max)", SQL_NTS);
CHKERROR (henv, hdbc, hstmt, rc, SQL_SUCCESS);
rc = SQLExecDirect (hstmt, "CREATE INDEX
cim_target_3_source_ix ON
cim_target (label_max)", SQL_NTS);
CHKERROR (henv, hdbc, hstmt, rc, SQL_SUCCESS);
  /* Create table cim_target_driver */
  rc = SQLExecDirect (hstmt, (SQLCHAR *)"CREATE TABLE
cim_target_driver ("
       "luid          INTEGER DEFAULT 0 NOT NULL, "
       "source        INTEGER DEFAULT 0 NOT NULL, "
       "sequence      INTEGER DEFAULT 0 NOT NULL, "
       "quality       INTEGER DEFAULT 0 NOT NULL, "
       "etype         INTEGER DEFAULT 0 NOT NULL, "
       "label_min     INTEGER DEFAULT 0 NOT NULL, "
       "label_max     INTEGER DEFAULT 0 NOT NULL, "
       "hidden        SMALLINT DEFAULT 0 NOT NULL, "
       "deleted       SMALLINT DEFAULT 0 NOT NULL, "
       "missing       SMALLINT DEFAULT 0 NOT NULL, "
       "target        INTEGER DEFAULT 0, "
       "driver        INTEGER DEFAULT 0, "
       "device        INTEGER DEFAULT 0, "
       "proxy_touch   INTEGER DEFAULT 0, "
       "proxy_schedule INTEGER DEFAULT 0, "
       "proxy_sims    INTEGER DEFAULT 0, "
       "proxy_probe   INTEGER DEFAULT 0, "
       "probe_priority INTEGER DEFAULT 0, "
       "supports_probe  SMALLINT DEFAULT 0, "
       "supports_monitor SMALLINT DEFAULT 0, "
       "supports_support SMALLINT DEFAULT 0, "
       "supports_missing SMALLINT DEFAULT 0, "
       "requires_polling SMALLINT DEFAULT 0, "
       "active_generation INT8 DEFAULT 0, "
       "tracking_sequence INT8 DEFAULT 0, "
       "active        SMALLINT DEFAULT 0, "
       "provider      SMALLINT DEFAULT 0, "
       "error         LVARCHAR DEFAULT 'A', "
       "all_attempts  INT8 DEFAULT 0, "
       "failed_attempts INT8 DEFAULT 0, "
       "recent_failures INT8 DEFAULT 0, "
       "last_probe    DATETIME YEAR TO SECOND, "
       "last_attempt  DATETIME YEAR TO SECOND, "
       "last_attempt_seconds INTEGER DEFAULT 0, "
       "last_failure  DATETIME YEAR TO SECOND, "
       "last_noop     DATETIME YEAR TO SECOND, "
       "last_duration INT8 DEFAULT 0, "
       "state         INTEGER DEFAULT 0, "
       "PRIMARY KEY (luid, source, sequence))", SQL_NTS);
CHKERROR (henv, hdbc, hstmt, rc, SQL_SUCCESS);
rc = SQLExecDirect (hstmt, "CREATE INDEX
cim_target_driver_0_sequence_ix ON cim_target_driver(sequence,
source)", SQL_NTS);
CHKERROR (henv, hdbc, hstmt, rc, SQL_SUCCESS);
rc = SQLExecDirect (hstmt, "CREATE INDEX
cim_target_driver_1_source_ix ON cim_target_driver(source,
sequence)", SQL_NTS);
CHKERROR (henv, hdbc, hstmt, rc, SQL_SUCCESS);
rc = SQLExecDirect (hstmt, "CREATE INDEX
cim_target_driver_2_source_ix ON cim_target_driver(label_min,
label_max)", SQL_NTS);
CHKERROR (henv, hdbc, hstmt, rc, SQL_SUCCESS);
  rc = SQLExecDirect (hstmt, "CREATE INDEX
cim_target_driver_3_source_ix ON cim_target_driver(label_max)",
SQL_NTS);
  CHKERROR (henv, hdbc, hstmt, rc, SQL_SUCCESS);
  rc = SQLExecDirect (hstmt, "CREATE INDEX
  cim_target_driver_4_ix ON
```

APPENDIX-continued

Application Example:

```
        cim_target_driver(driver)", SQL_NTS);
    CHKERROR (henv, hdbc, hstmt, rc, SQL_SUCCESS);
    rc = SQLExecDirect (hstmt, "CREATE INDEX
        cim_target_driver_5_ix ON
        cim_target_driver(target)", SQL_NTS);
    CHKERROR (henv, hdbc, hstmt, rc, SQL_SUCCESS);
    /* Disable (by setting to SQL_FALSE) the skip parser attribute. Here
    we will see after disabling we are running the same set of queries which
    we have run after enabling the skip parser attribute above. This shows
    how within the same application skip parser attribute can be set
    and reset */
    rc = SQLSetStmtAttr( hstmt, SQL_IFMX_ODBC_SKIP_PARSING,
        SQL_FALSE, 0);
    CHKERROR (henv, hdbc, hstmt, rc, SQL_SUCCESS);
    rc = SQLExecDirect(hstmt, (SQLCHAR *) "DROP TABLE
cim_target", SQL_NTS);
    CHKERROR (henv, hdbc, hstmt, rc, SQL_SUCCESS);
    rc = SQLExecDirect(hstmt, (SQLCHAR *) "DROP TABLE
cim_target_driver", SQL_NTS);
    /* Lets create the dropped tables */
    rc = SQLExecDirect (hstmt, "CREATE TABLE cim_target ("
            "luid          INTEGER DEFAULT 0 NOT NULL, "
            "source        INTEGER DEFAULT 0 NOT NULL, "
            "sequence      INTEGER DEFAULT 0 NOT NULL, "
            "quality       INTEGER DEFAULT 0 NOT NULL, "
            "etype         INTEGER DEFAULT 0 NOT NULL, "
            "label_min     INTEGER DEFAULT 0 NOT NULL, "
            "label_max     INTEGER DEFAULT 0 NOT NULL, "
            "hidden        SMALLINT DEFAULT 0 NOT NULL, "
            "deleted       SMALLINT DEFAULT 0 NOT NULL, "
            "missing       SMALLINT DEFAULT 0 NOT NULL, "
            "device        INTEGER DEFAULT 0, "
            "device_etype  INT8 DEFAULT 0, "
            "owner         INTEGER DEFAULT 0, "
            "proxy_state   INTEGER DEFAULT 0, "
            "proxy_version INTEGER DEFAULT 0, "
            "proxy_touch   INTEGER DEFAULT 0, "
            "public_target SMALLINT DEFAULT 0, "
            "device_type   INTEGER DEFAULT 0, "
            "reschedule    INTEGER DEFAULT 0, "
            "PRIMARY KEY (luid, source, sequence))", SQL_NTS);
    rc = SQLExecDirect (hstmt, "CREATE INDEX
        cim_target_0_sequence_ix
ON cim_target (sequence, source)", SQL_NTS);
    rc = SQLExecDirect (hstmt, "CREATE INDEX
        cim_target_1_source_ix ON
cim_target (source, sequence)", SQL_NTS);
    rc = SQLExecDirect (hstmt, "CREATE INDEX
        cim_target_2_source_ix ON
cim_target (label_min, label_max)", SQL_NTS);
    rc = SQLExecDirect (hstmt, "CREATE INDEX
        cim_target_3_source_ix ON
cim_target (label_max)", SQL_NTS);
    /* Create table cim_target_driver */
    rc = SQLExecDirect (hstmt, (SQLCHAR *)"CREATE TABLE
cim_target_driver ("
            "luid          INTEGER DEFAULT 0 NOT NULL, "
            "source        INTEGER DEFAULT 0 NOT NULL, "
            "sequence      INTEGER DEFAULT 0 NOT NULL, "
            "quality       INTEGER DEFAULT 0 NOT NULL, "
            "etype         INTEGER DEFAULT 0 NOT NULL, "
            "label_min     INTEGER DEFAULT 0 NOT NULL, "
            "label_max     INTEGER DEFAULT 0 NOT NULL, "
            "hidden        SMALLINT DEFAULT 0 NOT NULL, "
            "deleted       SMALLINT DEFAULT 0 NOT NULL, "
            "missing       SMALLINT DEFAULT 0 NOT NULL, "
            "target        INTEGER DEFAULT 0, "
            "driver        INTEGER DEFAULT 0, "
            "device        INTEGER DEFAULT 0, "
            "proxy_touch   INTEGER DEFAULT 0, "
            "proxy_schedule INTEGER DEFAULT 0, "
            "proxy_sims    INTEGER DEFAULT 0, "
            "proxy_probe   INTEGER DEFAULT 0, "
            "proxy_priority INTEGER DEFAULT 0, "
            "supports_probe   SMALLINT DEFAULT 0, "
            "supports_monitor SMALLINT DEFAULT 0, "
            "supports_support SMALLINT DEFAULT 0, "
            "supports_missing SMALLINT DEFAULT 0, "
            "requires_polling SMALLINT DEFAULT 0, "
            "active_generation INT8 DEFAULT 0, "
            "tracking_sequence INT8 DEFAULT 0, "
            "active         SMALLINT DEFAULT 0, "
            "provider       SMALLINT DEFAULT 0, "
            "error          LVARCHAR DEFAULT 'A', "
            "all_attempts   INT8 DEFAULT 0, "
            "failed_attempts INT8 DEFAULT 0, "
            "recent_failures INT8 DEFAULT 0, "
            "last_probe     DATETIME YEAR TO SECOND, "
            "last_attempt   DATETIME YEAR TO SECOND, "
            "last_attempt_seconds INTEGER DEFAULT 0, "
            "last_failure   DATETIME YEAR TO SECOND, "
            "last_noop      DATETIME YEAR TO SECOND, "
            "last_duraton   INT8 DEFAULT 0, "
            "state          INTEGER DEFAULT 0,"
            "PRIMARY KEY (luid, source, sequence))", SQL_NTS);
    rc = SQLExecDirect (hstmt, "CREATE INDEX
cim_target_driver_0_sequence_ix ON cim_target_driver(sequence,
source)", SQL_NTS);
    rc = SQLExecDirect (hstmt, "CREATE INDEX
cim_target_driver_1_source_ix ON cim_target_driver(source,
sequence)", SQL_NTS);
    rc = SQLExecDirect (hstmt, "CREATE INDEX
cim_target_driver_2_source_ix ON cim_target_driver(label_min,
label_max)", SQL_NTS);
    rc = SQLExecDirect (hstmt, "CREATE INDEX
cim_target_driver_3_source_ix ON cim_target_driver(label_max)",
SQL_NTS);
    rc = SQLExecDirect (hstmt, "CREATE INDEX
        cim_target_driver_4_ix ON
cim_target_driver(driver)", SQL_NTS);
    rc = SQLExecDirect (hstmt, "CREATE INDEX
        cim_target_driver_5_ix ON
cim_target_driver(target)", SQL_NTS);
    printf("Free handles...\n");
    SQLFreeHandle (SQL_HANDLE_STMT, hstmt);
    SQLDisconnect (hdbc);
    SQLFreeHandle(SQL_HANDLE_DBC, hdbc);
    SQLFreeHandle(SQL_HANDLE_ENV, henv);
    printf("Done\n");
    exit(0);
}
```

I claim:

1. A method for processing a query in a client-server database system, said database system having a server for managing content in a database and at least one client connected to said server via a network, said method comprising:

inputting a query to said client from an application, wherein said client intercepts the query before passing it to said server;

transmitting said inputted query from said client to said server, wherein a query parsing processing is skipped at said client, when specified by said application that outputs the query, wherein query response time is improved due to partial query processing, wherein said application may switch between specifying skipping and non-skipping with arbitrary timing, wherein a source code for said application includes a command for switching between skipping and not skipping said query parsing processing at said client;

parsing, at said server, said query received from said client; and executing said query at said server by manipulating data in said database according to said query.

2. The method of claim 1, wherein said client performs processing to determine query type and a number of parameters of said query before transmitting said query to said server.

3. A client-server database system for executing queries, said system comprising:
   a server for managing content in a database; and
   at least one client connected to said server via a network, wherein said client receives a query from an application, wherein the client and application reside within a single computer module, wherein said client intercepts the query before passing it to said server and transmits said query to said server via said network, wherein a query parsing processing skipped at said client, when specified by said application that outputs the query, wherein query response time is improved due to partial query processing, wherein said application may switch between specifying skipping and non-skipping with arbitrary timing, wherein a source code for said application includes a command for switching between skipping and not skipping said query parsing processing at said client; and
   said server parses said query transmitted from said client and executes said query by manipulating said content in said database in accordance with said query provided.

4. The system of claim 3, wherein said client performs processing to determine query type and a number of parameters of said inputted query before transmitting said inputted query to said server.

5. A computer program product including a computer readable storage medium having a computer program recorded therein for processing a query in a client of a client-server database system having a server for managing content in a database and parsing a query transmitted from a client and executing said query by manipulating said data in said database according to said query and at least one client connected to said server via a network, said computer program comprising:

computer program code for inputting a query from an application, wherein said client intercepts the query before passing it to said server; and
   computer program code for transmitting said inputted query to said server, wherein a query parsing processing is skipped at said client, when specified by said application that outputs the query, wherein query response time is improved due to partial query processing, wherein said application may switch between specifying skipping and non-skipping with arbitrary timing, wherein the computer program code further includes switching between skipping and not skipping said query parsing processing at said client.

6. The computer program product of claim 5, said computer program further comprising:
   computer program code for performing processing to determine query type and a number of parameters of said inputted query before transmitting said inputted query to said server.

7. The method of claim 1, wherein when said query parsing processing is skipped at said client, when specified by said application, the inputted query is transmitted from said client to said server without said client performing any parsing on said query.

8. The system of claim 3, wherein when said query parsing processing is skipped at said client, when specified by said application, the inputted query is transmitted from said client to said server without said client performing any parsing on said query.

\* \* \* \* \*